United States Patent
Kim et al.

(10) Patent No.: US 9,909,076 B2
(45) Date of Patent: Mar. 6, 2018

(54) INTEGRATED DRYING AND GASIFICATION PROCESS FOR SIMULTANEOUSLY PRODUCING SYNTHETIC GAS AND HIGH RANK COAL

(71) Applicants: SK INNOVATION CO., LTD., Seoul (KR); SK ENERGY CO., LTD., Seoul (KR)

(72) Inventors: Yong Jeon Kim, Daejeon (KR); Jong Sung Park, Daejeon (KR); Gyoo Tae Kim, Daejeon (KR); Nan Hee Ko, Gyeonggi-do (KR); Chun Won Lee, Seoul (KR); Jae Wook Shin, Seoul (KR)

(73) Assignees: SK INNOVATION CO., LTD., Seoul (KR); SK ENERGY CO., LTD., Seoul (KR)

( * ) Notice: Subject to any disclaimer, the term of this patent is extended or adjusted under 35 U.S.C. 154(b) by 222 days.

(21) Appl. No.: 14/653,339

(22) PCT Filed: Dec. 18, 2013

(86) PCT No.: PCT/KR2013/011812
§ 371 (c)(1),
(2) Date: Jun. 18, 2015

(87) PCT Pub. No.: WO2014/098472
PCT Pub. Date: Jun. 26, 2014

(65) Prior Publication Data
US 2015/0361361 A1  Dec. 17, 2015

(30) Foreign Application Priority Data
Dec. 20, 2012 (KR) .................. 10-2012-0149326

(51) Int. Cl.
*C10J 3/46* (2006.01)
*C10J 3/48* (2006.01)
(Continued)

(52) U.S. Cl.
CPC .............. *C10J 3/466* (2013.01); *C10J 3/00* (2013.01); *C10J 3/485* (2013.01); *C10J 3/84* (2013.01);
(Continued)

(58) Field of Classification Search
CPC ....................................... C01J 3/466
See application file for complete search history.

(56) References Cited

U.S. PATENT DOCUMENTS

| | | | | |
|---|---|---|---|---|
| 3,817,723 A * | 6/1974 | Donath | ..................... | C07C 1/02 208/414 |
| 3,985,519 A | 10/1976 | Kalina et al. | | |
| 5,685,138 A | 11/1997 | Rao et al. | | |
| 5,695,532 A * | 12/1997 | Johnson | ..................... | C10J 3/463 48/203 |
| 5,937,652 A * | 8/1999 | Abdelmalek | ............... | C10J 3/54 60/648 |
| 9,260,301 B2 * | 2/2016 | Anderson | ................ | C10J 3/482 |
| 2007/0277437 A1 | 12/2007 | Sheth | | |
| 2007/0289214 A1 * | 12/2007 | Briesch | ..................... | C10J 3/463 48/61 |

(Continued)

FOREIGN PATENT DOCUMENTS

CN 101220298 7/2008
CN 102453551 A 6/2012
(Continued)

OTHER PUBLICATIONS

Summary of Office Action and Chinese Office Action from Chinese Application No. 201380070795.7 dated Aug. 2, 2016.
European Search Report for EP 13 866 242.4 dated Aug. 5, 2016.

*Primary Examiner* — Colin W. Slifka
(74) *Attorney, Agent, or Firm* — Abelman, Frayne & Schwab

(57) ABSTRACT

The present invention relates to a gasification process for efficiently co-producing synthesis gas and high-grade coal from water-containing coal, and to an integrated drying and gasification system for realizing the same.

18 Claims, 2 Drawing Sheets

(51) Int. Cl.
*C10J 3/84* (2006.01)
*C10L 5/04* (2006.01)
*C10L 5/08* (2006.01)
*C10L 5/36* (2006.01)
*C10L 9/08* (2006.01)
*C10L 5/02* (2006.01)
*C10J 3/00* (2006.01)
*F26B 17/10* (2006.01)

(52) U.S. Cl.
CPC .................................. *C10L 5/02* (2013.01); *C10L 5/04* (2013.01); *C10L 5/08* (2013.01); *C10L 5/361* (2013.01); *C10L 5/363* (2013.01); *C10L 9/08* (2013.01); *F26B 17/102* (2013.01); *C10J 3/48* (2013.01); *C10J 2200/15* (2013.01); *C10J 2300/093* (2013.01); *C10J 2300/0909* (2013.01); *C10J 2300/1861* (2013.01); *C10L 2290/06* (2013.01); *C10L 2290/08* (2013.01); *Y02E 20/18* (2013.01)

(56) References Cited

U.S. PATENT DOCUMENTS

| | | |
|---|---|---|
| 2009/0084666 A1 | 4/2009 | Agrawal et al. |
| 2010/0313442 A1* | 12/2010 | Russell ............... F23K 1/04 34/468 |
| 2011/0146152 A1* | 6/2011 | Vimalchand ............... C10J 3/56 48/61 |
| 2011/0182778 A1 | 7/2011 | Breton et al. |
| 2012/0247080 A1 | 10/2012 | Ishii et al. |

FOREIGN PATENT DOCUMENTS

| | | |
|---|---|---|
| WO | 2010141930 A1 | 12/2010 |
| WO | 2012068931 A1 | 5/2012 |
| WO | 2012151625 A1 | 11/2012 |

* cited by examiner

INTEGRATED DRYING AND GASIFICATION PROCESS FOR SIMULTANEOUSLY PRODUCING SYNTHETIC GAS AND HIGH RANK COAL

CROSS-REFERENCE TO RELATED APPLICATIONS

This application is a National Phase of PCT/KR2013/011812, filed 18 Dec. 2013, which claims priority from Korean Application No. 10-2012-0149326 filed 20 Dec. 2012, the disclosures of which are incorporated herein by reference.

BACKGROUND OF THE INVENTION

1. Technical Field

This application claims the benefit of priority No. KR2012-0149326 filed on Dec. 20, 2012.

The present invention relates to a gasification process for co-producing synthesis gas and high-grade (high-quality) coal from water-containing coal. More particularly, the present invention relates to a gasification process in which a dryer for drying water-containing coal (feedstock) using the heat of synthesis gas is disposed in front of a gasifier, whereby dried coal can be easily transferred to the gasifier by a non-mechanical valve-type transfer means, and synthesis gas and high-quality coal containing a very small amount of water can be co-produced, and to an integrated drying and gasification system for realizing the same.

2. Description of the Related Art

Generally, a gasification process is a series of processes for converting a carbonaceous feedstock such as coal, biomass or the like into synthesis gas containing hydrogen and carbon monoxide as major components using a gasification reaction under the supply of a gasifying agent (for example, oxygen, steam, carbon dioxide or a mixture thereof). In this case, the term "synthesis gas" generally means a gas mixture including CO and $H_2$. Examples of typical reaction mechanisms of such a gasification process are represented by the following Reaction Formulae 1 to 3.

$C+\frac{1}{2}O_2 \rightarrow CO$ (partial oxidation)      [Reaction Formula 1]

$C+H_2O \rightarrow CO+H_2$ (steam reforming)      [Reaction Formula 2]

$C+CO_2 \rightarrow 2CO$ (carbon dioxide reforming)      [Reaction Formula 3]

Recently, a gasification process has been diversified into various kinds of technologies for producing various compounds, and application fields thereof have spread in order to produce various products including electric power. Specifically, it is known that a gasification process can be applied to power generation, ammonia preparation, oil refining and the like using hydrogen and carbon monoxide included in synthesis gas which is a main product of a gasification process; that it can be used to produce diesel oil, jet oil, lubricant base oil, naphtha and the like using synthesis gas as a feedstock of Fischer-Tropsch reaction represented by the following Reaction Formula 4; and that it can be used to produce high value-added chemical materials such as acetic acid, olefin, dimethyl ether, aldehyde, fuel, additives and the like using methanol prepared from synthesis gas as represented by the following Reaction Formula 5. In relation to this gasification process, in the case of Fischer-Tropsch process and methanol synthesis process, it is preferred that the ratio of carbon monoxide to hydrogen be about 1:2.

$nCO+2nH_2 \rightarrow C_nH_{2n}+nH_2O$      [Reaction Formula 4]

$CO+2H_2 \rightarrow CH_3OH$      [Reaction Formula 5]

However, in the case of synthesis gas obtained by the steam reforming reaction represented by Reaction Formula 2 above and the carbon dioxide reforming reaction represented by Reaction Formula 3 above, the ratio of carbon monoxide to hydrogen does not reach 1:2. Therefore, generally, the ratio of carbon monoxide to hydrogen may be adjusted to about 1:2 by performing the water-gas-shift reaction of a reaction product obtained after a steam reforming reaction, a partial oxidation reaction and/or a carbon monoxide reforming reaction or by additionally supplying hydrogen to the reaction product.

$CO+H_2O \rightarrow CO_2+H_2$      [Reaction Formula 6]

Meanwhile, since coal, which a typical feedstock in a gasification process, is distributed in large quantities over a wide area throughout the world, it is attracting considerable attention again as a fuel source that can replace petroleum that is commonly used at the present time. Further, since biomass, which has recently attracted attention, can also be converted into a basic fraction of various kinds of fuels and platform compounds by various treatment processes, there is a known technology of applying biomass as a feedstock in a gasification reaction.

However, the above-mentioned feedstock in a gasification process contains a large amount of water. For example, coals are classified into high-grade coal and low-grade coal depending on the properties thereof, such as heating value, water content, impurities, etc. Here, it is known that the amount of low-grade coal (brown coal, etc.) reserves occupies about 45% of the total amount of coal reserves throughout the world. Particularly, when the content of water in coal is high, the coal becomes poor in terms of storability, treatability, freight and the like, so a large amount of energy is consumed to remove water from the coal prior to a gasification reaction.

In relation to this, U.S. Pat. Nos. 5,695,532 and 5,685,138 disclose technologies for using the heat of synthesis gas to dry a water-containing carbonaceous feedstock by disposing a dryer in front of a gasification reactor and recycling the high-temperature synthesis gas generated from the gasification reactor into the dryer.

However, in order to supply the dried feedstock into an operating gasifier at high pressure, it is required that the supply pressure of the dried feedstock is higher than the operating pressure of the gasifier. Conventionally, in order to supply the feedstock (dry coal) dried by synthesis gas into a gasifier, a pressurization feedstock supply system including a buffer bin and a pressure lock hopper has been used. However, this pressurization feedstock supply system is problematic in that it is expensive and complicated and its operation logic must be elaborately adjusted. Particularly, when dried coal is carried to the gasifier using the pressure lock hopper, first, dried coal is transferred to the buffer bin, and is then supplied to the gasifier together with carrier gas with the dried coal being pressurized by the pressure lock hopper. In this case, the operation of a valve, the pressurization and depressurization of the pressure lock hopper, and the like must be accurately adjusted.

Further, synthesis gas is discharged from a gasifier at high temperature (1000 to 1500□), whereas synthesis gas having relatively low temperature (about 500□) may also be used in order to dry water-containing coal. For this reason, in conventional technologies, in order to supply thermal energy suitable for drying a water-containing feedstock introduced into a dryer, a heat exchanger is disposed behind a gasifier to decrease the temperature of the feedstock to the temperature of synthesis gas, and then the feedstock is recycled or is cooled to a temperature suitable for subsequent processes (for example, water-gas-shift reaction).

In this case, solid fuel dried by dryer, particularly, dried coal has higher quality than water-containing coal. Therefore, if such high-quality solid fuel (that is, dried coal) can be produced such that it is used as a feedstock for a gasification reaction as well as is applied to other uses, the added value in the total process will be increased. However, in order to produce a feedstock for a gasification reaction and high-quality solid fuel (coal) using the above-mentioned pressurization system including a buffer bin and a pressure lock hopper, it is inevitable that the size of equipment increases, and thus equipment investment cost and operation cost increase.

SUMMARY OF THE INVENTION

Accordingly, the present invention has been devised to solve the above-mentioned problems, and an object of the present invention is to overcome the conventional problem of utilizing the thermal energy of synthesis gas produced by a gasification reaction only to dry a feedstock in a dryer disposed in front of a gasification reactor by recycling the synthesis gas, thereby providing additional advantages.

In order to accomplish the above object, a first aspect of the present invention provides a gasification method of co-producing synthesis gas and high-quality coal, including the steps of: a) supplying water-containing coal to a dryer; b) drying the water-containing coal in the dryer, in which thermal energy necessary for drying the water-containing coal is supplied in contact with synthesis gas recycled to the dryer from a gasification step; c) separating dried coal and synthesis gas discharged from the dryer using solid-gas separation and then recovering the separated synthesis gas; d) recovering a part of the separated dried coal and simultaneously transferring the residual separated dried coal to a gasifier in a fluidic state using a loop seal type transfer means to which aeration gas is supplied by a plurality of ports; e) gasifying the transferred dried coal in the gasifier to prepare synthesis gas; and f) directly recycling the synthesis gas of 400 to 1500□ discharged from the gasifier without passing the synthesis gas through a heat exchanger, wherein the dryer provides a drying capacity necessary for producing the dried coal separated and recovered from the water-containing coal and the dried coal transferred to the gasification step.

The gasification method may further include the step of separating and recovering tar generated in the step of drying the water-containing coal and included in the synthesis gas in the step c) of recovering the synthesis gas.

A second aspect of the present invention provides an integrated drying and gasification system, including: a gasifier; a dryer disposed in front of the gasifier to dry water-containing coal in contact with synthesis gas recycled from the gasifier and then discharge dried coal and synthesis gas; a solid-gas separator for separating the dried coal and synthesis gas discharged from the dryer; a recovery unit for separating and recovering a part of the dried coal separated by the solid-gas separator; and a loop seal type transfer unit transferring the residual dried coal not recovered by the recovery unit to the gasifier and including a plurality of aeration gas inlets, wherein the synthesis gas discharged from the gasifier is directly recycled to the dryer without passing through a heat exchanger, and the dryer provides a drying capacity necessary for producing the dried coal separated and recovered from the water-containing coal and the dried coal transferred to the gasification step.

According to an embodiment of the present invention, the separated and recovered dried coal may be formed into pellets, briquettes or granules.

Further, in the gasification method according to an embodiment of the present invention, a drying capacity of water-containing coal (water content: 20 to 50 wt %) can be increased by 3 to 4 times compared to when synthesis gas of 700 to 1500□ discharged from a gasifier is cooled to 301 to 500□ by a heat exchanger disposed behind the gasifier and is then recycled to a dryer.

BRIEF DESCRIPTION OF THE DRAWINGS

The above and other objects, features and advantages of the present invention will be more clearly understood from the following detailed description taken in conjunction with the accompanying drawings, in which.

REFERENCE NUMERALS

Figure 1:
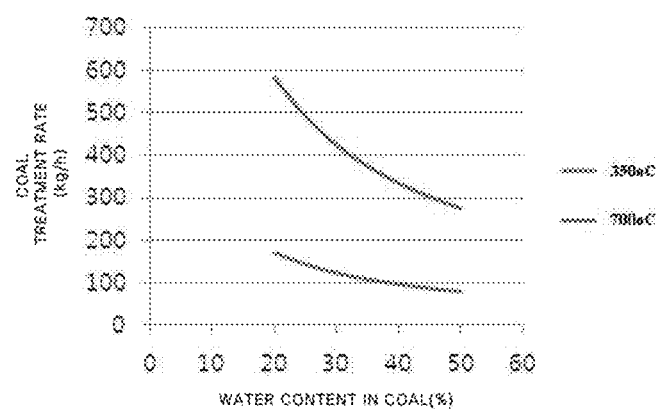
FIG. 1 is a simulation graph showing the coal treatment capacity depending on the content of water in coal when synthesis gas having passed through a gasifier and a heat exchanger and synthesis gas having not passed therethrough are respectively used as a heat source for drying water-containing coal.

100: dryer
103: cyclone
104: downcomer
106: drain hopper
107: loop seal type transfer means
200: pressurized dried coal supply system
300: gasifier

DESCRIPTION OF THE PREFERRED EMBODIMENTS

Hereinafter, preferred embodiments of the present invention will be described in detail with reference to the attached drawings.

The above and further objects and novel features of the invention will be better understood from the following detailed description when the same is read in connection with the accompanying drawing. It is to be expressly understood, however, that the drawing is for purpose of illustration only and is not intended as a definition of the limits of the invention.

Coal

According to an embodiment of the present invention, "coal" includes anthracite coal, soft coal (bituminous coal), low-grade coal (Sub-bituminous, brown coal, peat etc.), and the like. Therefore, coal is not limited to specific grade coal, and, particularly, low-grade coal is utilized to the highest degree to increase economical efficiency. The content of carbon in coal by weight may be 20 wt % or more, specifically 30 to 80 wt %, and more specifically 40 to 70 wt %, based on the total weight. Further, the content of ash in dry coal by weight may be 20 wt % or less, specifically 5 to 15 wt %, and more specifically 8 to 12 wt %. The ash includes silica, calcium oxide and iron oxide in large amounts, and includes potassium oxide, magnesium oxide, titania, zinc oxide and the like in small amounts.

However, although embodiments of the present invention are described based on coal, variously-derived solid fuels, for example, water-containing biomass, water-containing waste and the like, can be used instead of coal as long as they are suitable for an integrated drying and gasification process and can be obtained in the form of high-quality solid fuel. Therefore, it can be understood that the usage of such various solid fuels is also included in the embodiment of the present invention.

According to an embodiment of the present invention, the above-mentioned advantage can be realized by using water-containing coal as a feedstock, so it is preferred that low-grade coal containing an equivalent amount of water is used. In this case, the content of water in coal may be 10 to 70 wt % or less, specifically 20 to 50 wt %, and more specifically 20 to 40 wt %. In the case where water-containing coal exists in the form of slurry, the content of solid in stuffy may be 30 to 80 wt %.

Further, in order to allow coal to be easily brought into contact with synthesis gas and easily transferred in a dryer in the drying step (to allow coal to be easily transferred in the dryer even when synthesis gas is present at comparatively low pressure), the coal may be pulverized to a particle size of 50 to 6000 μm, specifically 50 to 2000 μm, and more specifically 100 to 1000 μm, and is then introduced into the dryer.

Dryer

According to an embodiment of the present invention, a dryer (drying region) is disposed in front of a gasifier. In relation to this, examples of the dryer may include a pneumatic or flash dryer, a fluidized-bed dryer, a rotary dryer, a rotary tube dryer and the like. However, in order to effectively remove water, it is advantageous that a pneumatic or flash dryer, which can rapidly remove coal because water is easily diffused, is used as the dryer.

In this embodiment, it is preferred that water-containing coal is closely brought into contact with synthesis gas recycled from the gasifier (that is, heat-exchanged with synthesis gas) to be heated and dried to generate steam. In this case, as coal is dried, the temperature of synthesis gas is lowered.

According to an embodiment of the present invention, water-containing coal is supplied to the lower portion of a dryer, and synthesis gas recycled from a gasifier is also supplied to the lower portion thereof. In this case, water-containing coal and synthesis gas come into contact with each other, move toward the top of the dryer in parallel, and are discharged from the dryer. Selectively, the dryer may be configured such that water-containing coal and synthesis gas are introduced into the upper portion of the dryer, come into contact with each other, and move toward the bottom of the dryer. In this case, considering the discharge route (line) of synthesis gas discharged from the gasifier, it is advantageous that inlets (ports) of water-containing coal and synthesis gas in the dryer are set such that the recycle line thereof is simplified or minimized.

Meanwhile, the operating pressure in the dryer may be adjusted depending on the operating pressure in the gasifier from which recycled synthesis is discharged. For example, the operating pressure in the dryer may be adjusted in the range of 60 kg/cm² or less.

The operating temperature in the dryer may also be changed depending on the discharge temperature of synthesis gas recycled from the gasifier. For example, the operating temperature at the inlet of the dryer may be adjusted in the range of 400 to 1500□ and preferably 800 to 1200□, and the operating temperature at the outlet of the dryer may be adjusted in the range of 200 to 700□ and preferably 250 to 500□. The dried coal may have a water content of 10 wt % or less, specifically 1 to 8 wt %, and more specifically 1 to 5 wt %.

According to an embodiment of the present invention, it is preferred that water-containing coal is dried by vaporizing only the water in the water-containing coal in the dryer. In this case, the degree of drying of the water-containing coal may be set differently depending on the supply of the water-containing coal and the temperature and residence time of synthesis gas in the dryer.

However, according to an embodiment of the present invention, when synthesis gas is recycled into the dryer in an amount of heat value more than that of heat value necessary for drying the water-containing coal, volatile components as well as water are separated from the water-containing coal. Here, such volatile components are included in the synthesis gas discharged from the dryer in the form of tar. Therefore, in this embodiment, selectively, tar may be separated and recovered from the synthesis gas, and may be formed into products.

Generally, a dryer, and particularly a flash dryer, is characterized in that only water is removed from coal in a short residence time while volatile components remain in the coal. Therefore, when high-temperature synthesis gas stays in the dryer for a long time, volatile components in the coal is also discharged from the dryer together with synthesis gas, so characteristics, such as heat value and the like, of dried coal are changed, and subsequent processes are influenced by volatile components included in synthesis gas, and thus, if possible, it is advantageous that residence time is set such that only water is removed without removing volatile components. In relation to this, the residence time in the dryer may be 2 to 10 seconds, specifically 2 to 5 seconds, and specifically 2 to 3 seconds.

Selectively, it is preferred that, as described above, tar is produced during the drying process, and the tar is formed into products. In this case, when synthesis gas recycled into the dryer is supplied in an amount of heat value more than that of heat value necessary for drying water-containing coal or the residence time of synthesis gas in the dryer is maintained relatively long, synthesis gas discharged from the dryer contains tar, and the tar can be separated and recovered from the synthesis gas.

In this embodiment, as described later, since synthesis gas discharged from the gasifier is directly transferred to the dryer through a pipe line without passing through a heat exchanger, high-temperature synthesis gas is introduced, which differs compared to a conventional integrated drying and gasification process, and thus the drying capacity of coal also increases.

According to an embodiment of the present invention, a drying capacity of water-containing coal (water content: 20 to 50 wt %) can be increased by 3 to 4 times compared to when synthesis gas of 400 to 1500□ discharged from the gasifier is cooled to 300 to 500□ by the heat exchanger disposed behind the gasifier and is then recycled to the dryer.

The above process conditions in the dryer can be illustratively understood, and may be changed depending on the size, type and the like of the dryer.

FIG. 1 is a graph showing the simulation test results (SK pilot plant: capacity of 3 ton/day) of the coal treatment capacity depending on the content of water in coal when synthesis gas (350□) having passed through a gasifier and a heat exchanger and synthesis gas (700□) having not passed through the heat exchanger are respectively used as a heat source for drying water-containing coal in the dryer (integrated dryer) according to an embodiment of the present invention.

The test conditions and the change in coal treatment capacity depending on water content are shown in Tables 1 and 2 below.

TABLE 1

| Content of water in coal after drying (%) | 2 |
|---|---|
| Temperature at outlet of dryer | Min. 200□ |

TABLE 2

| Content of water in coal (%) | Coal treatment rate depending on synthesis gas temperature (kg/hr) | |
|---|---|---|
| | 350□ | 700□ |
| 20 | 171 | 582 |
| 25 | 144 | 491 |
| 30 | 124 | 424 |
| 35 | 109 | 374 |
| 40 | 98 | 334 |
| 45 | 88 | 302 |
| 50 | 81 | 275 |

Loop Seal Type (Non-Mechanical Valve Type) Pressurized Dried Coal Supply System

According to an embodiment of the present invention, dried coal and synthesis gas (specifically, steam-containing synthesis, which generally contains steam in an amount of 10 to 50 mol %) discharged from a dryer is transferred to a dried coal supply system including a solid-gas separator, a recovery unit for additionally separating and recovering a part of separated dried coal and a loop seal type transfer means for transferring residual dried coal to a gasifier. Specifically, products discharged from the dryer are separated into dried coal and synthesis gas by the solid-gas separator. Here, as the solid-gas separator, a commonly-known solid-gas separator may be used. A cyclone separator is an example of a typical solid-gas separator.

The cyclone is an apparatus for separating particles existing in fluid (gas) using centrifugal force, and includes a tangential inlet for introducing solid-containing gas, an outlet for discharging solid-containing gas and an outlet for discharging collected solids. According to an embodiment of the present invention, the cyclone includes a cylindrical portion and a conic portion connected to the cylindrical portion, and is configured such that the upper end of a downcomer is connected with the narrow lower end of the conic portion of the cyclone. The inlet of the downcomer is connected with the solid discharging outlet of the cyclone, and may have a pipe shape. The lower portion of the downcomer constitutes a part of the following loop seal type transfer means.

A part of the separated dried coal is additionally separated and then recovered by the recovery unit before it is transferred to a gasifier. Here, the recovery unit may be a drain hopper, a continuous depressurization drain unit or the like.

As described above, dried coal is obtained by removing a large amount of water from a feedstock, and may become high-quality coal existing in the form of particle when it is selectively pulverized before it is dried. Therefore, the dried coal has properties suitable for formation or fabrication into pellets, briquettes or granules. As such, the dried coal is advantageous in that it is a high value-added coal, and that, when it is formed or fabricated into a product, treatability and transportability as well as added value can be improved.

According to an embodiment of the present invention, the recovered dried coal may be formed into pellets using an organic or inorganic binder known in the related field. The organic binder may be acrylic emulsion, acryl-styrene emulsion, cellulose ether, polyvinyl alcohol, phenol resin, polyimide or a mixture thereof. The inorganic binder may be bentonite or the like. Specifically, dried coal is mixed with the binder, and then the mixture is kneaded, pelletized by a forming machine and then dried and cooled to be formed into a product. If necessary, dried coal may be palletized without using the binder. For example, a part of dried coal is heated to the softening point thereof, and is then pressurized to allow it to be agglomerated into naturally-present tar and pitch. The above-mentioned process of forming dried coal into a product can be illustratively understood. Therefore, another process of forming dried coal into a product, known in the related field, may be adopted as long as it can suitably utilize high-quality dried coal.

Meanwhile, non-recovered dried coal is transferred to a gasifier as a feedstock for a gasification reaction. As will be described later, the gasifier is operated at a pressure of several to several tens of kg/cm$^2$. Therefore, the pressure of synthesis gas discharged from the gasifier is partially lowered during a process of transferring it to the dryer and a process of drying it in the dryer, and the pressure of the fuel supply unit and reaction unit of the gasifier is high compared to the pressure of the discharge unit of the gasifier, so the pressure of the dried coal is lower than the pressure in the gasifier. Therefore, in order to transfer (supply) the dried coal into the gasifier, that is, in order for solids to move from a low-pressure region to a high-pressure region, the dried coal must be supplied at pressure higher than the pressure in the gasifier.

For this purpose, in this embodiment, dried coal is transferred to the gasifier by forming a static head of the fluidized dried coal using a loop seal type transfer means. In this case, high-pressure (higher than pressure in loop seal structure) aeration gas is supplied through a plurality of ports provided in the loop seal structure. In the loop seal structure, the supplied high-pressure aeration gas forms the coal inventory in the loop seal structure into a fluidized layer and maintains the fluidized layer, thus enabling the dried coal to be transferred to the gasifier.

In this case, as the aeration gas, nitrogen, carbon dioxide, steam, synthesis gas generated from the gasifier or a mixture thereof may be used.

Gasifier

According to an embodiment of the present invention, as a gasifier, various types of reactors known in the related field may be used. The gasifier is provided with a dried coal inlet and, if necessary, a gasifying agent inlet. Examples of a gasifier may include a moving-bed gasifier (dried carbonaceous feedstock is introduced into the upper portion thereof, and a gasifying agent comes into contact with the feed stock in a counterflow manner in the lower portion thereof), a fluidized-bed gasifier (a gasifying agent floats solid particles while passing through a carbonaceous feedstock bed), a transport reactor-integrated gasifier, a distributary flow gasifier (a carbonaceous feedstock and a gasifying agent are introduced in parallel), and the like.

According to an embodiment of the present invention, the operating temperature in the gasifier may be 400 to 1500□, specifically 800 to 1500□, and more specifically 900 to 1500□. Further, the operating pressure in the gasifier may be 1 to 60 kg/cm$^2$, specifically 5 to 40 kg/cm$^2$, and more specifically 20 to 40 kg/cm$^2$. Further, the molar ratio of O$_2$/C may be 0.1 to 1.0, and specifically 0.2 to 0.7.

However, in this embodiment, the molar ratio of steam/C may be substantially adjusted to 0 (in the case of a dry gasification reaction or a gasification reaction by reforming carbon dioxide. In this case, the molar ratio of steam/C may be 0 to 2, and specifically 0 to 1. Further, the molar ratio of CO$_2$/C may be 0 to 1, and specifically 0 to 0.5.

According to an embodiment of the present invention, in the gasification reaction, the conversion ratio of carbon in coal may be 80% or more, and specifically 90 to 99%.

Meanwhile, according to an embodiment of the present invention, since the produced synthesis gas is discharged from the gasifier at high temperature depending on the operating temperature in the gasifier, this synthesis gas is directly recycled into the dryer without passing through a heat exchanger.

Figure 2:
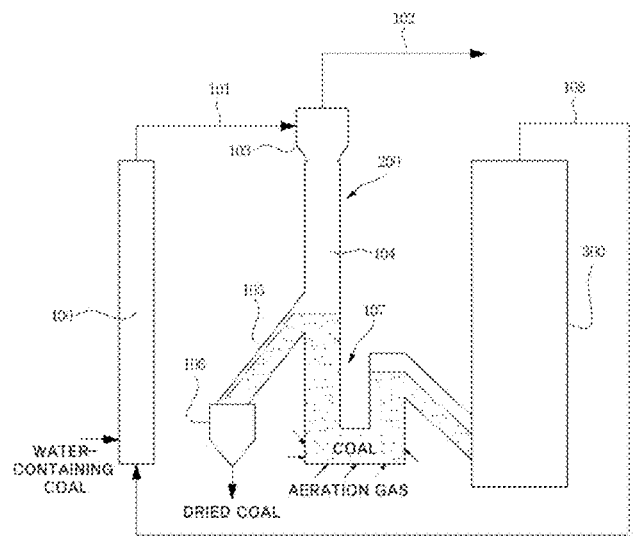
FIG. 2 is a schematic view showing an integrated drying and gasification process for co-producing synthesis gas, tar and high-quality coal using a loop seal type transfer means according to an embodiment of the present invention.

FIG. 2 schematically shows an integrated drying and gasification process for co-producing synthesis gas, tar and high-quality coal using a loop seal type transfer means according to an embodiment of the present invention.

In FIG. 2, the integrated drying gasification process largely includes a dryer 100, a pressurized dried coal supply system 200 and a gasifier 300. If not particularly mentioned, the constituents in the integrated drying gasification process may be connected with each other by a commonly-used connecting means, for example, a pipe, and coal and gas may be transferred there between through the connecting means.

In this embodiment, water-containing coal is introduced into the lower portion of the dryer 100, and synthesis gas directly recycled from the gasifier 300 is also introduced into the lower portion of the dryer 100. In this case, as described above, the temperature of the synthesis gas discharged from the gasifier 300 is not greatly different from the operating temperature of the gasifier 300, but the synthesis gas may be cooled to 20~100□ during the process of recycling this synthesis gas into the dryer 100. However, as shown in FIG. 2, since the synthesis gas is not arbitrarily cooled by a heat exchanger, the dryer is designed to have a drying capacity higher than that of a dryer used in a general integrated drying and gasification process.

Further, in this embodiment, dried coal and a gas mixture are discharged from the upper portion of the dryer 100, and the content of water in each of the discharged dried coal and gas mixture is determined depending on the temperature and pressure of synthesis gas introduced into the dryer 100, the initial water content and particle size of a water-containing coal feedstock and the mixing ratio of synthesis gas and coal (feedstock) introduced into the dryer 100. Here, the weight ratio of synthesis gas and water-containing coal introduced into the dryer 100 may be 1:1 to 10:1, specifically 2:1 to 8:1, and more specifically 3:1 to 6:1.

Further, in this embodiment, dried coal (that is, dried solid fuel) and synthesis gas are transferred from the top of the dryer 100 to the pressurized dried coal supply system 200 through a line 101. The dried coal supply system 200 largely includes a cyclone 103, which is a solid-gas separator, a drain hopper 106 and a loop seal type transfer means 107. The cyclone 103 serves to separate a gaseous component (synthesis gas) and a solid component (dried coal). In this case, since the separated synthesis gas 102 may include dust, sulfur compounds, nitrogen compounds and the like, it may be additionally pass through a post-treatment process (not shown) provided with a filter (ceramic filter), an electric dust collector, a scrubber, a desulfurizer and the like. For example, the synthesis gas 102 separated in this way may be supplied to a subsequent process such as an integrated gasification combined cycle (IGCC) process, an F-T process or the like. Further, as described above, when tar is included in the synthesis gas, a means or process for separating and recovering tar (not shown) may be additionally provided. As the means for separating and recovering tar, a means commonly used in the related field (for example, filter or the like) may be used.

Meanwhile, dried coal separated by the cyclone 103 moves downwards along a downcomer 104 connected with the lower end of the cyclone 103 (accurately, the lower end of a conic portion of the cyclone 103). In this case, the downcomer 104 is provided at the lower portion thereof with a dried coal separation line 105, and the dried coal separation line 105 is connected with a drain hopper 106, thus recovering dried coal.

Meanwhile, residual dried coal, which is not separated and recovered, is introduced into a loop seal type transfer means 107. According to an embodiment of the present invention, the content ratio of separated and recovered dried coal to dried coal transferred to the gasifier may be suitably changed depending on the amount of a desired target product (synthesis gas or high-quality dried coal). For example, the content ratio thereof by weight may be 1:1 to 4:1, and specifically 2:1 to 3:1.

Figure 3:
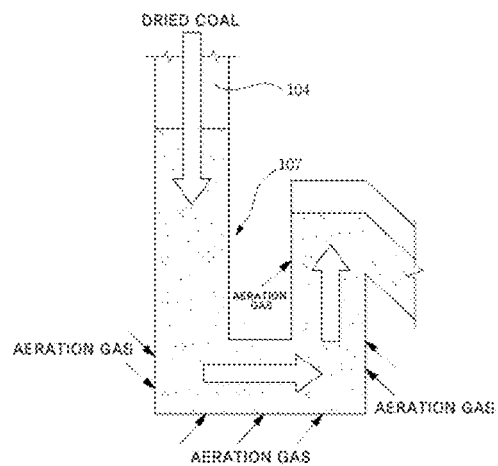
FIG. 3 is an enlarged view showing the moving route of dried coal in the loop seal type transfer means of FIG. 2.

FIG. 3 shows the moving route of dried coal in the loop seal type transfer means in the integrated drying gasification process shown in FIG. 2.

As shown in FIG. 3, the loop seal type transfer means 107 is provided with a plurality of aeration gas injecting ports. In this case, dried coal sequentially passes through the lower end of the downcomer 104, the horizontal region of the loop seal type transfer means 107 and the vertical region of the loop seal type transfer means 107 to be transferred toward the high-pressure gasifier 300.

Meanwhile, in the gasifier 300, the transferred dried coal is gasified by various reaction routes (partial oxidation, carbon dioxide reforming, steam reforming, and combinations thereof) in the presence of a gasifying agent to produce synthesis gas. In this case, when aeration gas supplied from the loop seal type transfer means is used as a gasifying agent, since the aeration gas is also introduced into the gasifier 300, the amount of the gasifying agent introduced into a gasifying agent injection port (inlet) provided in the gasifier may be adjusted.

After the gasification reaction is completed, the synthesis gas produced by the gasification reaction is partially or entirely recycled into the dryer 100 through a line 108. According to an embodiment of the present invention, when the synthesis gas is entirely recycled into the dryer 100, the conversion rate of water-containing coal into dried coal can be maximized. In this case, the molar ratio of carbon monoxide in the discharged synthesis gas may be 10 to 50%, and specifically 20 to 40%.

As described above, according to the integrated drying and gasification process of the present invention, coal dried by synthesis gas is supplied to a gasifier by a non-mechanical valve-type transfer means such as a loop seal type transfer means, so process equipment can be simplified and can be easily operated. Further, according to the gasification process of the present invention, the dryability of water-containing coal can be increased compared to a conventional technology in which synthesis gas is cooled by a heat exchanger disposed behind a gasifier and is then recycled to a dryer, and a part of dried coal is recovered as high-quality coal and is then formed into pellets, briquettes, granules and the like. Furthermore, according to the gasification process of the present invention, tar, which is caused by volatile components separated from coal according to the degree of the selective supply of heat to synthesis gas in the step of drying the water-containing coal, can be separated and recovered from the synthesis gas and can be formed into products.

As such, according to the gasification process of the present invention, when a feedstock for a gasification reaction and high-quality coal can be simultaneously produced from low-quality water-containing coal, a loop seal type transfer means is used instead of a conventional lock hopper, so a process can be simplified and the problem of investment cost being increased by the increase in size of the transfer means can be overcome. Moreover, according to the gasification process of the present invention, a heat exchanger, which is generally used in a conventional integrated drying and gasification process, is not needed, so equipment investment cost can be reduced. Further, if necessary, tar is additionally separated from synthesis gas and formed into products, thus increasing added value.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A gasification method of co-producing synthesis gas and high-quality coal, comprising the steps of:
   a) supplying low-quality water-containing coal to a dryer;
   b) drying the low-quality water-containing coal in the dryer, in which thermal energy necessary for drying the low-quality water-containing coal is supplied in contact with synthesis gas recycled to the dryer from a gasification step;
   c) separating dried coal and synthesis gas discharged from the dryer using solid-gas separation and then recovering the separated synthesis gas;
   d) transferring target amounts of the separated dried coal to a gasifier in a fluidic state using a loop seal type transfer means to which aeration gas is supplied by a plurality of ports and simultaneously recovering a high-quality dried coal which is not transferred to the gasifier;
   e) gasifying the transferred dried coal in the gasifier to prepare synthesis gas; and
   f) directly recycling the synthesis gas of 400 to 1500° C. discharged from the gasifier without passing the synthesis gas through a heat exchanger(s),
   wherein the dryer provides a drying capacity necessary for producing the dried coal separated and recovered from the low-quality water-containing coal and the dried coal transferred to the gasification step.

2. The gasification method of claim 1, wherein the content of water in the low-quality water-containing coal is 10 to 70 wt %.

3. The gasification method of claim 1, wherein the dried coal has a water content of 10 wt % or less.

4. The gasification method of claim 1, wherein the low-quality water-containing coal is pulverized to a particle size of 50 to 6000 μm and then introduced into the dryer, before the step a).

5. The gasification method of claim 1, wherein the content of carbon in the low-quality water-containing coal is at least 20 wt %.

6. The gasification method of claim 1, wherein the dryer is a pneumatic or flash dryer, a fluidized-bed dryer, a rotary dryer or a rotary tube dryer.

7. The gasification method of claim 6, wherein the dryer is a pneumatic or flash dryer.

8. The gasification method of claim 1, wherein the low-quality water-containing coal and synthesis gas are in contact with each other in a parallel stream in the dryer.

9. The gasification method of claim 1, wherein the operating pressure in the dryer is 60 kg/cm$^2$ or less, the operating temperature at an inlet of the dryer is adjusted in a range of 400 to 1500° C., and the operating temperature at an outlet of the dryer is adjusted in a range of 200 to 700° ° C.

10. The gasification method of claim 1, further comprising the step of forming the dried coal separated and recovered in the step d) into pellets, briquettes or granules.

11. The gasification method of claim 1, the aeration gas is nitrogen, carbon dioxide, steam, synthesis gas generated from the gasifier, or a mixture thereof.

12. The gasification method of claim 1, wherein the operating temperature in the gasifier is 400 to 1500° C., and the operating pressure in the gasifier is 1 to 60 kg/cm$^2$.

13. The gasification method of claim 1, wherein, in the step e), the molar ratio of $O_2/C$ is 0.1 to 1.0, and the molar ratio of $CO_2/C$ is 0 to 1.

14. The gasification method of claim 1, wherein, in the step e), the molar ratio of steam/C is 0 to 2.

15. The gasification method of claim 1, wherein the weight ratio of synthesis gas recycled to the dryer in the step b): low-quality water-containing coal is 1:1 to 10:1.

16. The gasification method of claim 1, wherein the weight ratio of dried coal separated and recovered in the step d): dried coal transferred to the gasifier is 1:1 to 4:1.

17. The gasification method of claim 1, further comprising the step of separating and recovering tar generated in the step of drying the low-quality water-containing coal and included in the synthesis gas in the step c) of recovering the synthesis gas.

18. The gasification method of claim 17, wherein the dryer provides a heat capacity larger than a drying capacity necessary for producing the dried coal separated and recovered from the low-quality water-containing coal and the dried coal transferred to the gasification step.

* * * * *